Oct. 17, 1950   R. J. WILLIAMS ET AL   2,526,184
SEAT AND BACK FRAME AND SPRING CONSTRUCTION
Filed Sept. 2, 1949   6 Sheets-Sheet 3

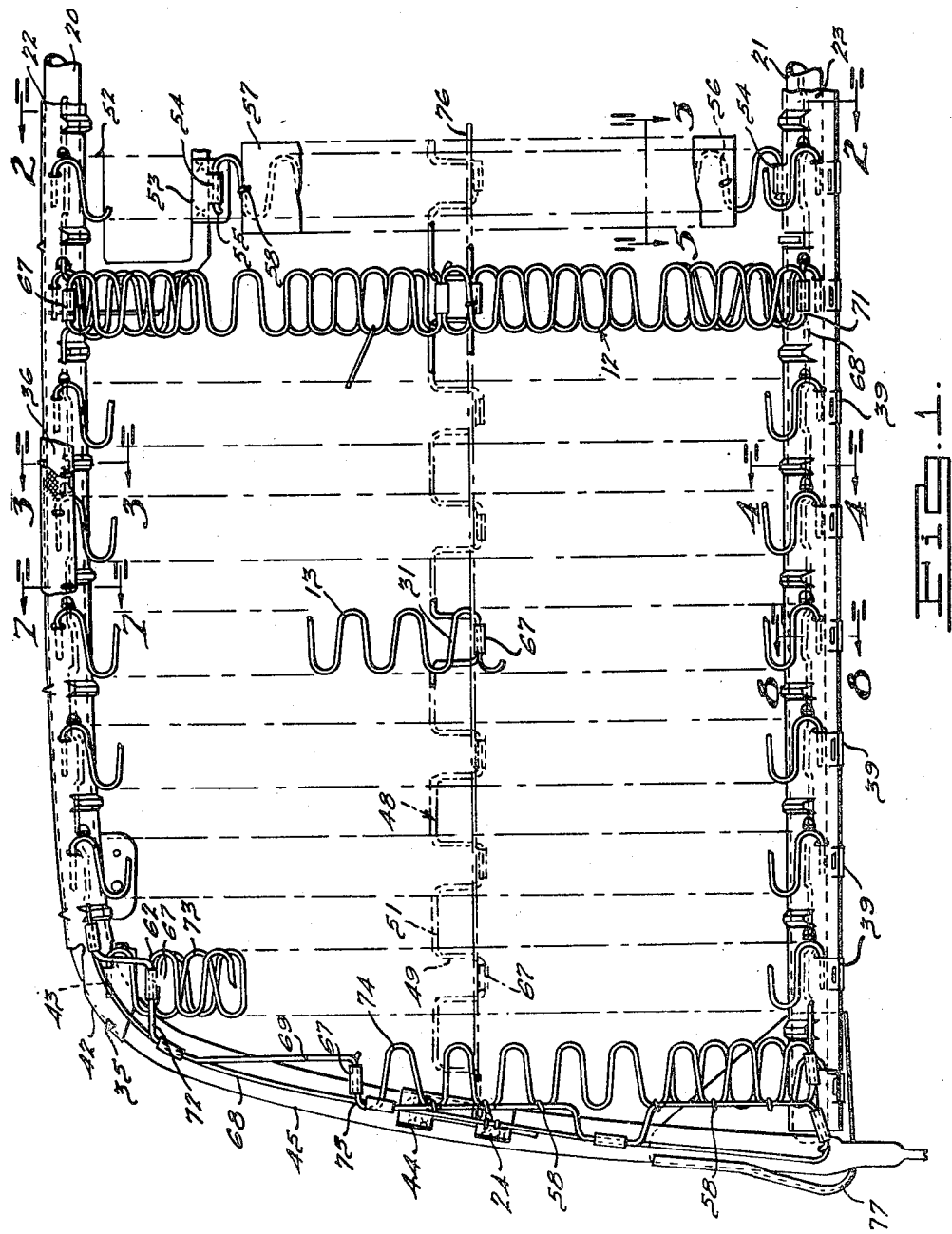

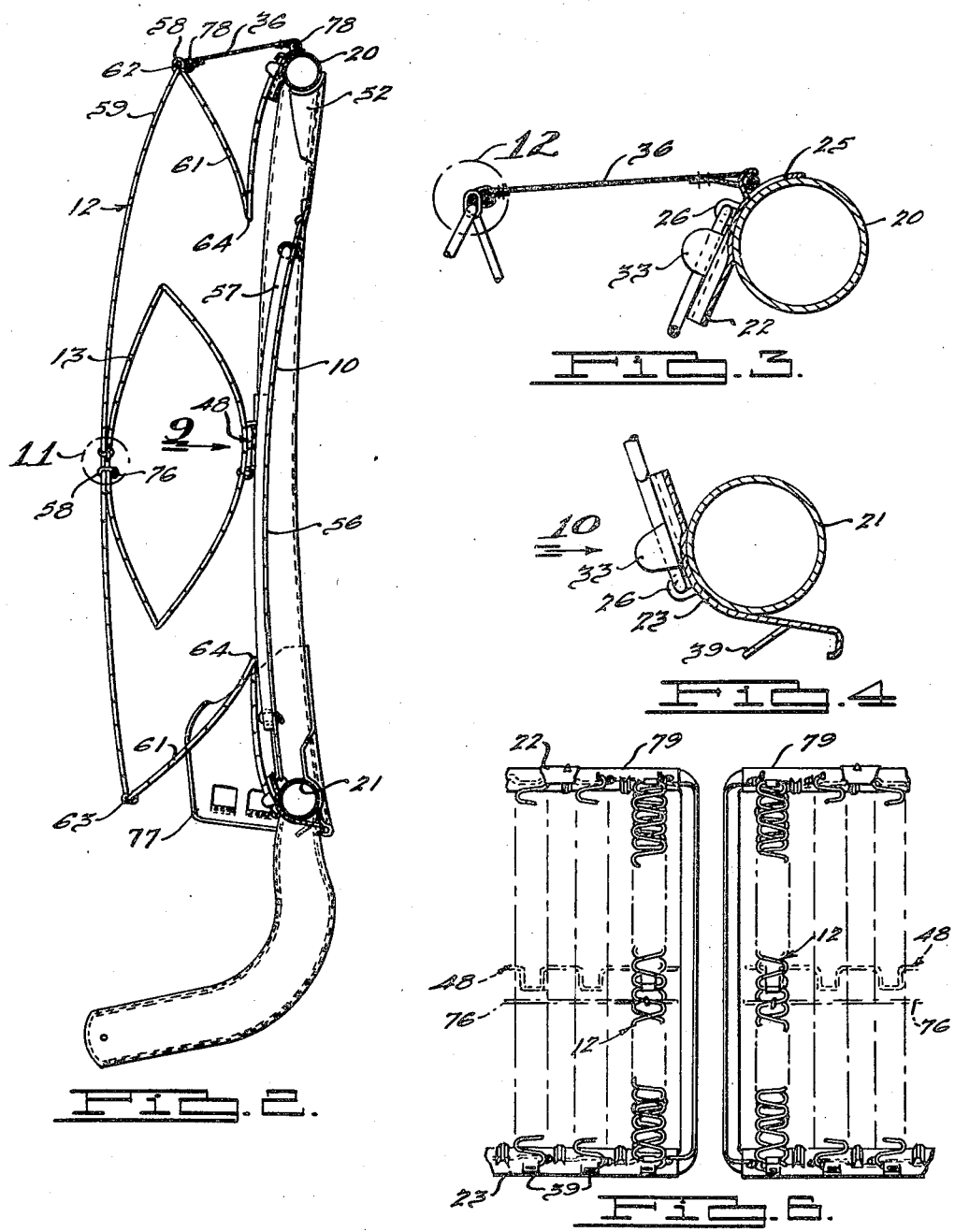

INVENTORS.
Richard J. Williams,
Glynn L. Stine,
Frederick C. Matthaei, Jr.
BY
Harness, Dickey & Pierce.
ATTORNEYS.

Oct. 17, 1950 R. J. WILLIAMS ET AL 2,526,184
SEAT AND BACK FRAME AND SPRING CONSTRUCTION
Filed Sept. 2, 1949 6 Sheets-Sheet 5

INVENTORS.
Richard J. Williams,
Glynn L. Stine,
Frederick C. Matthaei, Jr.
BY
Harness, Dickey & Pierce.
ATTORNEYS.

Oct. 17, 1950     R. J. WILLIAMS ET AL     2,526,184
SEAT AND BACK FRAME AND SPRING CONSTRUCTION
Filed Sept. 2, 1949     6 Sheets-Sheet 6
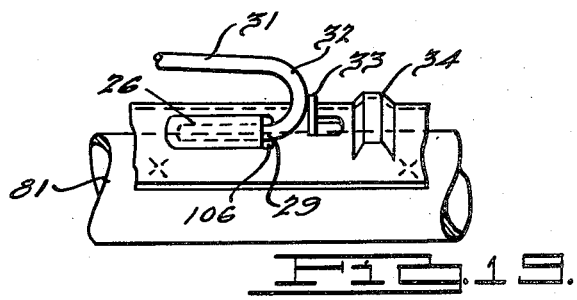
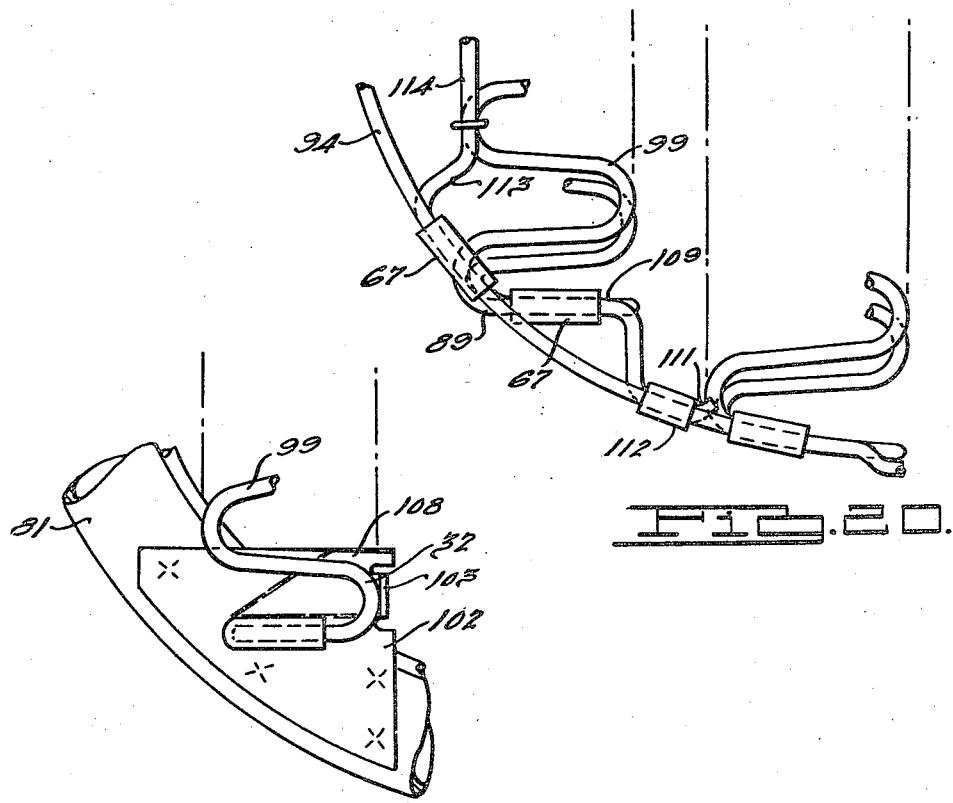

Patented Oct. 17, 1950

2,526,184

UNITED STATES PATENT OFFICE 2,526,184

SEAT AND BACK FRAME AND SPRING CONSTRUCTION

Richard J. Williams, Birmingham, and Glynn L. Stine and Frederick C. Matthaei, Jr., Detroit, Mich., assignors to American Metal Products Company, Detroit, Mich., a corporation of Michigan Application September 2, 1949, Serial No. 113,804

30 Claims. (Cl. 155—179)

1

This invention relates to spring frame constructions for seats, and particularly to a spring unit assembly for a seat as constructed prior to upholstering.

The present invention pertains to the frame and spring assembly for a back and seat cushion of a seat as used primarily in automotive vehicles. Both the seat and back frames are made of rigid construction as by stamping, tubing and the like. In the illustration accompanying the present invention, the frame is made of tubular construction having stamped elements applied thereto. It will be understood that the frame may be made of stamping incorporating the stamped elements herein illustrated as applied to tubing.

The stamped elements are so formed as to have spaced tunnels provided therein which are open at one end for receiving the ends of spring strips and are closed at the opposite ends for limiting the extent to which the end may project therein. Adjacent to the open end, a tab is struck upwardly which engages the loop portion of the spring strip adjacent to the end to prevent the strip from moving laterally, which thereby prevents the end from moving out of the tunnel.

The springs are preferably made of wire bent back and forth in zigzag form to provide open, oppositely disposed loops joined by straight portions. Lengths of the strips are formed at the ends in a predetermined manner, preferably by reversely bending the ends of the strips which have a reversely bending portion therein. This provides a V-shaped supporting end which produces a soft supporting edge to the main load supporting portion of the spring assembly. After a plurality of springs are so secured across the seat and back frames, the side and edges of the load supporting portions thereof are secured in predetermined relation by a border wire, which is clipped to the spring strips at the reversely bent ends thereof.

On the seat frame, a V-shaped portion of the sinuous spring strip is secured between the frame and the border wire to provide additional support for the side edges thereof. The top portion of the V-shaped spring is bent inwardly to be disposed in a horizontal plane and secured to the load supporting portion of the assembly at the sides to provide additional spring support therefor. A clip is secured on the side portions of the tubular seat frame having a tunnel in which the end of the V-shaped spring is secured, and having adjacent to the open end of the tunnel a projecting tab which prevents the spring end from moving outwardly thereof.

2

A listing strip is provided between the top load supporting portion of the spring strips and the reversely bent end portion at the front of the assembly for controlling the resulting arc of the top seating portion. Contour control is provided to the central load supporting portion of the spring strips by the use of an additional length of spring strip which is hog-ringed thereto. This additional spring strip may be of the same or different gauge of wire employed in the manufacture of the main spring strips, depending upon the amount of control which is required thereby. The use of this helper-type of spring strip is illustrated and described in the copending application of Williams and Stine, Serial No. 82,202, filed March 18, 1949, and assigned to the assignee of the present invention.

The back frame is narrower at the top than at the base and the border wire which follows the form of the frame likewise slopes outwardly from the top toward the bottom. A filler wire is provided to the side portions of the border wire, so shaped as to support the end of a partial length of spring employed as the end spring at the bottom, and to secure the end of the next adjacent spring below the top of the frame. The side portions of the frame are provided with a clip of unique construction having an arcuate lip over which the end of the supporting spring is secured and having on each side thereof a projecting tab permitting the clip to be used either on the right or left-hand side of the frame, whether or not the supporting wire element has its end directed upwardly or downwardly.

A supporting strip is secured laterally between the frame sides, midway between the top and bottom of the frame, having U-shaped portions of a width to receive a securing clip. The spacing of the U-shaped portion may be greater or smaller than that disclosed in the figure, depending upon the spacing of the spring strips across the bottom and top elements of the frame which are aligned therewith. When the back frame is of substantial width to extend completely across the automobile body, an additional spring strip is employed between the top and bottom elements of the frame midway between the side portions of the frame. A pad of jute or like sound-deadening material is provided upon the spring strip on which the laterally disposed supporting element rests and is retained out of metal contact therewith by the pad.

The load supporting portion of the spring strips spanning the frame is reinforced by spring elements of football-like formation, as illustrated and described in the copending application of Frederick C. Matthaei, Jr., Serial No. 99,952, filed June 18, 1949, and assigned to the assignee of the present invention. In this arrangement, the central part of the lower arcuate portion of the reinforcing springs is secured to the U-shaped portions of the supporting strips by suitable clips, the upper portion being secured to the main load supporting portion of the main spring strips by hog rings which secure the two ends of the assisting spring together. A listing strip having a wire in the spaced edges has one edge secured by hog rings to the top portion of the border wire, and the other edge secured to the upper metal strip by tongues struck therefrom which are bent downwardly over the wire edge after the listing strip is forced thereover. The listing strip spans the area between the top of the frame and the top portion of the border wire. The same construction is employed when the seat back frame is divided as employed in a two-door type of automobile body which permits one portion of the frame to tilt relative to the other portion, following the common practice.

Accordingly, the main objects of the invention are: to provide frames for supporting springs for seat and back cushions, having thereon tunnels which are open at one end and closed at the other for limiting the projection of the end of the spring strip therein, and having adjacent to the open ends struck-up tabs which prevent the ends from moving outwardly therefrom; to provide seat and back frames which support springs thereacross in a manner to form a seating surface supported at the ends on V-shaped portions of the strips and having the sides, front and top edges enclosed in a border element which is clipped thereto, and formed at the sides in a manner to receive the ends of the endmost springs which are offset from the ends of the centrally disposed springs; to reinforce the side edges of a spring seating surface formed by spring strips extended thereacross by the application of a V-shaped spring strip which is secured to the sides of the frame and to the border wire and which is strengthened through an extension of the strip in the plane of the seating surface to which it is attached; to reinforce the load supporting portion of spring strips by additional strips of football-like form which are secured to the underside of the load supporting portion and to a supporting element extending laterally between the frame sides; to reinforce the central part of the spring assembly between the sides of a frame by an additional spring strip disposed parallel to the sides and provided with a sound-deadening material which prevents noises being created by contact with the main spring assembly when in engagement therewith; to provide a clip for a length thereof having struck-out tunnels, one end of which is open, the other end of which is closed, for the reception of the end spring strips, and having an additional tongue struck therefrom and spaced from the open end of the tunnel for preventing the strip from moving laterally relative thereto; to provide a strip having supporting means for engaging and supporting the ends of springs with a channel formation to provide strength thereto, and struck-out tabs having apertures therein to which the upholstery material of the cushion may be secured; to provide a strip having supporting means for supporting the end of sinuous spring strips with a plurality of projecting tabs which engage the edge of a listing strip and secure it in position relative to the frame, and, in general, to provide a seat and back frame for a spring assembly which is simple in construction, rugged in assembly, and economical of manufacture.

Other objects and features of novelty of the invention will be specifically pointed out or will become apparent when referring, for a better understanding of the invention, to the following description taken in conjunction with the accompanying drawings, wherein:

Figure 1 is a view in elevation of the left-hand portion of a seat back, with parts broken away, embodying features of the present invention;

Fig. 2 is a sectional view of the structure illustrated in Fig. 1, taken on the line 2—2 thereof;

Fig. 3 is an enlarged sectional view of the structure illustrated in Fig. 1, taken on the line 3—3 thereof;

Fig. 4 is an enlarged sectional view of the structure illustrated in Fig. 1, taken on the line 4—4 thereof;

Fig. 5 is an enlarged sectional view of the structure illustrated in Fig. 1, taken on the line 5—5 thereof;

Fig. 6 is a view of the structure illustrated in Fig. 1 showing a modified form thereof;

Fig. 19 is a view of the front edge of the frame and supporting strip applied thereto, as viewed from the point 19 of Fig. 14;

Fig. 20 is a plan view of the corner of the top load supporting portion of the spring assembly, as viewed from the lower left-hand corner of Fig. 13, and Fig. 21 is a view of the corner of the frame, as viewed from the lower left-hand corner of Fig. 13 beneath the portion illustrated in Fig. 20.

Figure 7:
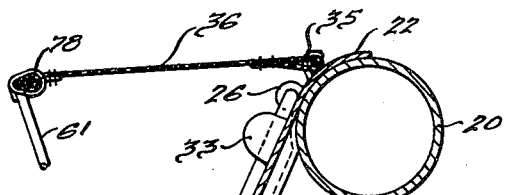
Fig. 7 is an enlarged sectional view of the structure illustrated in Fig. 1, taken on the line 7—7 thereof.
Figure 8:
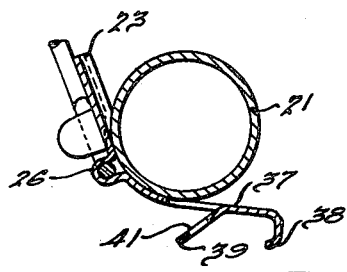
Fig. 8 is an enlarged sectional view of the structure illustrated in Fig. 1, taken on the line 8—8 thereof.

The figures of the drawings cover a seat made up of a back frame and a seat frame, having securing elements thereon for supporting a plurality of spring strips thereacross to form a completely sprung seat as furnished prior to the application of the padding and upholstery material. It is to be understood that certain features of the supporting and reinforcing elements in the spring strip assembly, as applied specifically to the seat and back frames of the seat, may be interchanged and be applied respectively to the back and seat frames. Such applications may be made to meet the requirement of providing the proper support, rate, contour, rigidity and comfort which change from time to time as the characteristics of the body and its sprung support change.

Referring first to the seat back frame construction 10, as illustrated in Figs. 1 to 12 inclusive, which is illustrated as being made from a downwardly presenting U-shaped tubular element 20 interconnected at the bottom by a horizontally disposed tubular section 21, the top horizontal portion of the U-shaped tubular element 20 has secured thereto, preferably by welding, a spring-supporting strip 22, a somewhat similar strip 23 being secured to the bottom horizontal section 21 of the frame. A supporting clip 24 is welded or otherwise secured to the arms of the U-shaped element 20 midway between the top and bottom of the frame. It is within the purview of this invention to form the tubular elements 20 and 21 as a stamping in which the characteristics of strips 22, 23 and clips 24 are incorporated.

For the purpose of illustration, the strips 22, 23 and clips 24 are illustrated as being applied to the tubular elements 20 and 21, respectively of the frame rather than in unit relation with stamped elements thereof.

The strip 22, as illustrated in Fig. 3, has an arcuate portion 25 which snugly fits the tubular portion 20 and is welded directly thereto. A struck-out tunnel 26 is provided (see Fig. 10) at spaced points between the ends of the strip having a closed end 27 and an open end 28 for the reception of the end 29 of a spring strip 31. The closed end 27 of the tunnel limits the extent to which the end may extend therewithin, thereby preventing the arcuate portion 32 of the loop from engaging and rubbing on the metal at the open end which would produce undesirable noises and squeaks. Tabs 33 are provided in the strip spaced from the open ends 28 of the tunnels in position to engage the loop of the spring strip adjacent to the secured end to prevent the end from moving out of the tunnel. The projecting portions of the strips 22 and 23 between the tunnels 26 have offset portions 34 provided therein to strengthen the projecting portion and prevent it from bending toward the tubular frame as the base of the projecting portions are in engagement therewith. The strip 22 employed at the top of the frame has spaced struck-up pointed tongues 35 for piercing and supporting one edge of the listing strip 36 in a manner to be described more fully hereinafter.

The strip 23 at the bottom of the frame is the same as the strip 22 at the top of the frame, with the exception that the edge opposite to that containing the projecting portions 34 is extended at 37 and reversely bent at 38 to provide strength to the edge and width thereto so that the upholstery material may be drawn thereover without tearing. Inwardly of the channel portion 38, but in alignment therewith, tabs 39 are struck therefrom having slots 41 therein to which the upholstery material may be hog-ringed. It is contemplated that the upholstery material is in the form of a sack open at the bottom to be drawn downwardly over the padding, frame and springs in the final trim operation. In forming the strip, the tab 39 is lanced from the sheet prior to the drawing of the projecting tunnel portions so that material may be drawn from the metal adjacent to the lanced tab since, as will be noted in Fig. 10, the tab is aligned with the tunnel.

The ends of the strip 22 are offset at 42 to be secured to the arcuate portion of the top corners of the frame and to have the tunnel 43 thereof disposed downwardly out of alignment with the tunnels 26 in the main portion of the strip. In a similar manner, a pointed tongue 35 is provided in the end corner portion to engage the endmost portion of the listing strip. It is to be understood that the strips 22 and 23 may extend entirely across the frame or may be made in two or three sections to form a complete strip when applied to or incorporated in the frame element. When the strip is an integral part of the stamped frame, the length thereof will conform to the lengths of the stamping making up the frame. After the frame is constructed in this manner to have the tunnels 26 disposed in a vertical alignment between the top and bottom frame portions, the clips 44 are applied to the arm portions 45 at the side of the frame.

Figure 9:
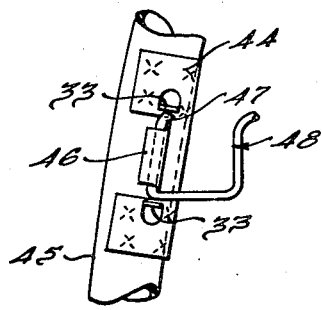
Fig. 9 is an enlarged broken view of the structure illustrated in Fig. 2, as viewed from the line 9 thereof.
Figure 10:
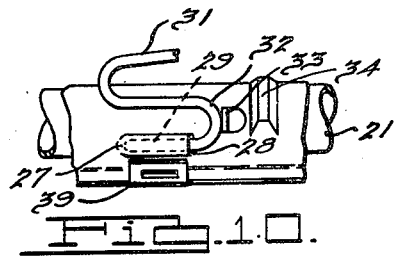
Fig. 10 is a plan view of the structure illustrated in Fig. 4, as viewed from the line 10 thereof.
Figure 11:
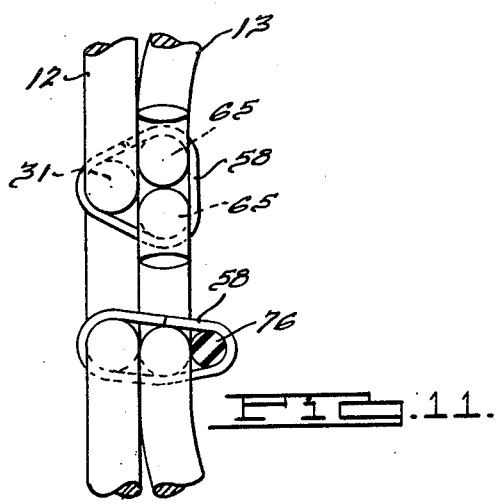
Fig. 11 is an enlarged broken view of the structure illustrated in Fig. 2, as disclosed within the circle 11 thereof.
Figure 12:
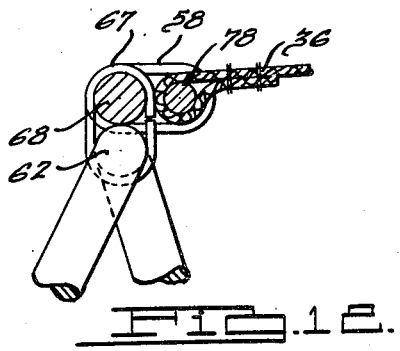
Fig. 12 is an enlarged broken view of the structure illustrated in Fig. 3, taken on the line 12—12 thereof.
Figure 13:
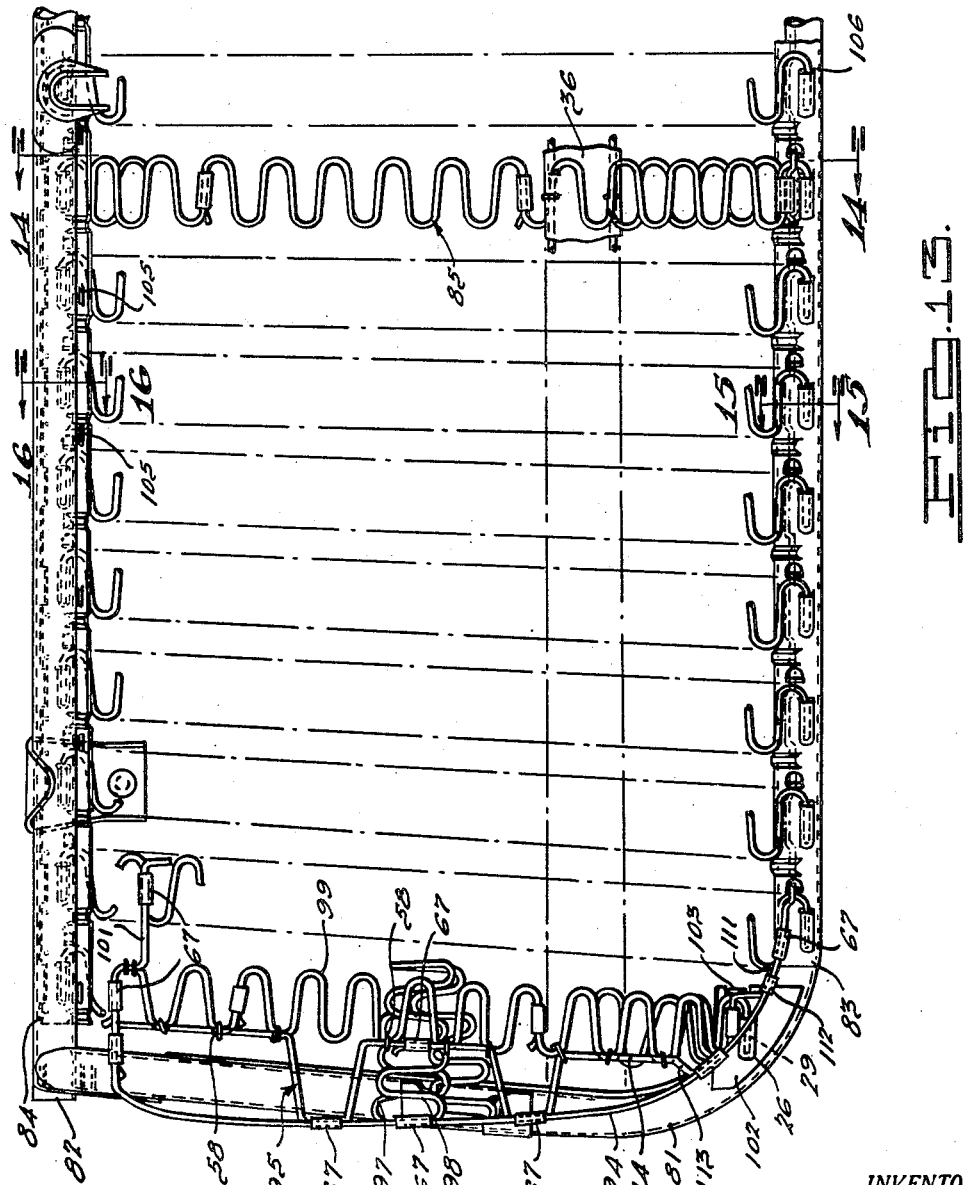
Fig. 13 is a plan view of a seat frame and springs applied thereto with parts broken away.

The clips 44, as illustrated more specifically in Fig. 9, have a downwardly presented arcuate tongue 46 which receives the end 47 of a laterally disposed wire supporting element 48. It will be noted in this construction that at each side of the tongue 46 a struck-up tab 33 is disposed in position to secure the end 47 in the tongue 46, whether or not the end is pointing upwardly or downwardly, and whether or not the clip 44 is applied to the right or left-hand arm 45. The supporting element 48 is made of wire formed to provide U-shaped portions 49 disposed in alignment with the tunnels 26 and 43 on the strips 22 and 23. The U-shaped portions 49 are spaced by the straight portions 51 which may vary in length conforming to the spacing of the spring strips.

The frame is provided medially of the sides with a stamping 52 (see Fig. 1) by which the seat is secured rigidly in place in the automotive body. A spring-securing plate 53 is formed in, or attached to, the stamping 52, having a tunnel 54 therein through which the end of a spring strip is secured and retained in position by the bent end 55 of the strip. A similar tunnel 54 is provided in a plate which is welded to the lower frame element 21, or such tunnel may be struck from the strip 23. A spring strip 56 is secured between the tunnels 54 disposed beneath the supporting element 48 and between which a pad of jute or other sound-deadening material 57 is secured by hog rings 58 to the spring 56. The spring 56 provides additional support to the center of the spring assembly which is required due to the substantial length of the frame.

The spring strips 12 have an arcuate seating portion 59 and V-shaped supporting portions 61 at both ends, produced by reversely bending the straight portions 31 at the top end 62, the bottom end 63, and at the apex 64 of the V-shaped portion 61. A secondary supporting element 13 of football shape, is attached to the supporting portion 59 of the main spring strips by a hog-ring 58 which engages the straight portion 31 of the supporting portion of the strip to the free ends 65 of the auxiliary supporting spring element 13. This not only secures the seating portion 59 to the reinforcing element 13 but also secures the two ends 65 of the portion 13 in unit relation. After the spring elements 12 and 13 are assembled together, the end 29 of the main spring strips are placed within the tunnels 26 of the top strip 22, with the seating portion extending outwardly so that when it is dropped into position the loop portions 32 will pass downwardly ahead of the projecting tab 33, which thereby prevents the lateral movement of the strips and the ends 29 from the tunnels. The ends 29 at the lower portion of the main spring strips are forced into the tunnels of the strip 23 with the loops raised sufficiently to pass over the top of the tabs 33 so that the loop will snap downwardly as the ends reach the end of the tunnels in a position forwardly of the tabs to prevent the ends from moving outwardly of the tunnels. Thereafter, clips 67 secure the center of the bottom arcuate portion of the supporting football-like element 13 to the web of the U-shaped portions 49 of the supporting element 48 to be in unit relation therewith. A border wire 68, having a filler wire element 69 secured thereto at each side, is then assembled to the ends 62 and 63 of the top supporting portion 59 by clips 67. The border wire 68 at the top and bottom has offset portions 71 provided therein at points to which the clips 67 are applied to prevent the longitudinal shifting of the ends 62 and 63 of the supporting portion 59 of the strips relative to the wire and frame. The filler wire 69 has an offset portion 72 therein to which the end 62 of the spring element 73, which has a seating portion 59 shorter than the main spring elements, is secured by a clip 67. The springs 73 are next adjacent to springs 74 which are the endmost springs of the assembly. An additional offset portion 75 is provided in the wire 69 for receiving the end of the springs 74 which are secured thereto by clips 67. The springs 74 and 73 are shortened to fill in the area resulting from the outward sloping of side frame arms 45. The offset portions in the wire 69 are parallel to the end wires of the springs and are clipped thereto to form a spring support for the side edges. The lateral edges of the springs 74 are secured to the wire 69 by hog rings 58. The side portion of the border wire and the wire 69 deflects with the springs and provides a continuous surface for supporting the padding over which the upholstery material is secured. A resilient rubber strip 76 is secured across the seating portion of all of the assembled springs by hog rings 58 for transferring the load applied at any one point to adjacent springs and for retaining the springs spaced a predetermined distance from each other.

It is to be understood that when assembling a group of springs in this manner the gauge of the various wires making up the elements may vary. For example, the gauge of the wire of the spring strips 12 and the reinforcing spring strips 13 may be the same or of different gauges. The strip 12 may be made of 11-gauge wire while the spring elements 13 may be made of 13 or 14-gauge wire. Similarly, the supporting element 48 may be made of 9-gauge wire, while the springs 56 may be made of 9 or 10-gauge wire. The gauges may vary depending upon whether or not the supporting portion 59 is to be made softer or harder or is to have a different contour or rate following the requirements of the particular body to which the seat is to be applied. Similarly, the dimensions of the assisting springs 13 may change, the top and bottom arcuate portions may be made longer, flatter, or struck from an arc of smaller or larger radius.

The ends of the springs 13, while illustrated as being joined together, may be spaced apart when secured to the seating portion 59 of the springs 12 to thereby change the supporting characteristics of the spring 13 and the resulting spring support of the supporting portion 59 of the spring strips. It will be noted in Fig. 1 that after the clips 67 have been applied to the springs 13, the straight portion 31 of the spring spans the U-shaped portion 49 of the strip 48, thereby preventing the tilting of the springs 13 sidewardly and the rocking of the springs 13 upwardly. A stamping 77 may be provided on each of the side members 45 of the frame at the bottom thereof over which the side portions of the trim material are drawn.

The listing strip 36 is made of burlap or like material having a hem in each end in which a wire 78 is supported. One wire and hem are secured to the border wire 68 about the spring elements 12 by hog rings 58 disposed between the clips 67 which secure the ends 62 to the border wire, as illustrated more specifically in Fig. 12. The wire and hem at the rear edge of the listing strip 36 is secured over the tongues 35 of the strip 22, after which the tongues are clinched over the material and the wire 78. The listing strip spans the space between the border wire 68 and the frame element 20 to support the padding material placed thereover beneath the trimming material, in the conventional manner.

In Fig. 6, a pair of frame elements 79 is illustrated as being disposed in aligned relation to each other to provide the back similar to that illustrated in Fig. 1, which is separated in the middle and employed for a seat back for a two-door type of automobile body. Either back section may hinge forwardly over the seat cushion. The only difference in this construction is the separation of the two frame portions in the center of the seat and the elimination of the spring 56 and pad 57. Otherwise the construction is the same as that above described for the unit seat back.

Referring to Figures 13 to 21, a seat frame and spring assembly is illustrated, that embodying a frame 81 of U-shape joined to a horizontally disposed tubular frame element 82 at the rear. A sheet metal strip 83 is attached to the forward edge of the frame element 81 and a similar strip 84 is attached to the rear horizontal tubular element 82. Here again it is to be understood that the strip may be a part of the stamping which goes to make up the frame elements 81 and 82 when stampings are employed instead of the tubular elements herein illustrated. The strips 83 and 84 are similar and follow the construction of the strips 22 and 23 above described relative to the back frame.

Closed end tunnels 26 are provided in the strip having adjacent to the open ends tabs 33 which engage the loop portions 32 of the spring strips 85 when the end portion 29 has been inserted in the tunnel. The projecting edge of the strip is strengthened by the projecting portions 34 disposed between each of the tunnels 26. The sheet has an arcuate portion which engages the tubular sections and is welded thereto. As pointed out hereinabove, the strips are similar but do distinguish from each other in that the strip 83 has the tunnel spaced a greater distance apart than the spacings of the tunnel 26 in the strip 84. This is desirable in view of the fact that the rear edge of the seat is narrower than the front edge and the strips 85 are crowded closely together at the rear edge of the frame.

The spring strips 85 are similar to those illustrated, described and claimed in the co-pending application of Richard J. Williams and Glynn L. Stine, Serial No. 82,202, filed March 18, 1949, and assigned to the assignee of the present invention. The strips have a seating portion 87 extending from a V-shaped front edge supporting portion 88 having at the front end 89 and at the apex of the V a vertically extending loop which reduces the amount of twisting in the straight portion 31 of the strip. In other words, by reversely bending and forming the V, the straight portions are torsionally strained only half the amount that would result if all of the twist were applied to a single straight portion. At the rear end the seating portion 87 has an offset portion 91 parallel to the seating portion which is joined by a straight portion 92. This provides resiliency to the rear end of the seating portion 87 at the height of the frame when the end is supported on the under side of the tubular frame element 82.

A listing strip 36, having wires 78 in the hems at the edges, is secured to the apex of the V portions 88 and the seating portion directly thereabove by hog rings 58. The listing strip retains the apex portion of the V 88 in a desired position relative to the seating portion 87 and maintains a flat arc to the seating portion. A helper spring 93 is applied to the under side of the seating portion 87 by clips 58, as pointed out in the above-mentioned application. The helper spring is shorter than the length of the seating portion to be spanned thereby so that it must be stretched and tensioned when applied. This is necessary to provide the desired helper effect.

The springs are assembled on the strips in the same manner as pointed out hereinabove with regard to the assembly of spring strips on the back frame, after which a border wire 94 is applied to the front and sides of the seating portion 87 of the spring strips. Before the application thereof, the border wire is provided at the sides, with the formed wire 95 being secured thereto by clips 67. The border wire along the front edge thereof has offset areas to which the ends 89 of the seating portion 87 of the spring strips are secured by the clips 67. The offset portion prevents the spring strips from shifting laterally relative to each other when in assembled relation.

It will be noted from Fig. 20 that the wire 95 has an offset portion 109 to which the end 89 of the spring 99 is secured by a clip 67. The wire is formed at the end into a hook 111 and secured to the border wire by a short clip 112, while the wire adjacent to the offset portion 109 extends along the border wire to be secured by a clip 67. The wire is then bent inwardly at 113 and then straight at 114, following the lateral portion of the strip 99.

Clips 96 are welded or otherwise secured to the side portions of the frame element 81, having tunnels 26 therein and an adjacent projecting tab 33 for securing a V-shaped spring element 97 thereto. The flat portion of the clip which extends from the portion secured to the frame on which the adjacent loop is supported is braced by side portions 100 which prevent the central flat portion from deflecting. The upper portion of the spring element is secured by a clip 67 to the border wire and rigidity is provided to the spring element by the top horizontal portion 98 thereof, the inner end of which is secured to the wire 95 by a clip 67. The loops 32 on the endmost strips 99 are secured to the wire 95 by hog rings 58. The rear ends of the border wire 94 are projected laterally and secured by clips 67 to the two endmost spring strips 85 and 99. The end of the supporting V portion of the spring strip 99 is secured to the upper rounded corner of the frame by a tunnel 26 in a plate 102 which is welded or otherwise secured to the tubular frame element 81. The plate will be an integral part of the stamping if the frame is made from stamped elements. To prevent the loop portion 32 adjacent to the end portion 29 from moving outwardly and releasing the end portion, a tongue 103 is formed by shearing the edge of the plate and bending the tongue upwardly. It will be noted from Fig. 21 that the plate 102 is provided with an upwardly sloping surface 108 on which the loop portion 32 of the spring 99 rests to prevent the supporting portion from rotating downwardly when the seat is occupied. The tunnel on the plate 102 is disposed out of alignment with the tunnels 26 on the strip 83 as the seating portion of the strip 99 is shorter than the seating portion of the strips 85 in view of the arcuate corner. In all of the constructions the portion of the strips containing the tunnels project outwardly of the frame in position to engage the loop adjacent to the secured end to prevent the supporting end portions of the strips from rotating downwardly at the front end and to limit the upward movement at the rear end. It will be noted that the end portions of the seating strips 91 are disposed below the frame element, the strip containing the tunnels being applied to the under side of the frame element 82. A rubber strip 104 is secured to the lower face of the projecting portion of the strip 84, being secured thereto by suitable means, herein illustrated as by staples 105. It will be noted further that in forming the tunnels at the open end portion a lancing or punching operation is performed at 106 to permit the metal to be drawn upwardly into the shape of the tunnel. The rubber strip 104, secured to the under face of the projecting portion of the strip 84, being a soundproofing material, prevents noises occurring as the portion 91 of the strip 85 is moved under load.

Figure 14:
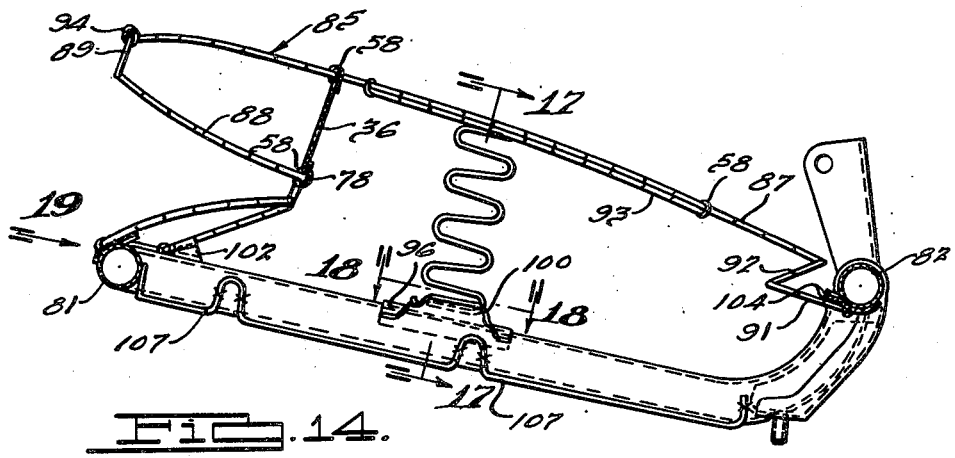
Fig. 14 is a sectional view of the structure illustrated in Fig. 13.
Figure 15:
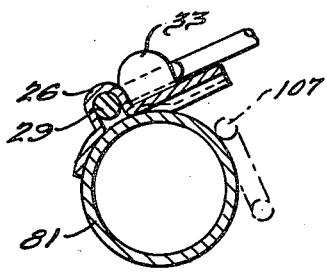
Fig. 15 is a sectional view of the structure illustrated in Fig. 13, taken on the line 15—15 thereof.
Figure 16:
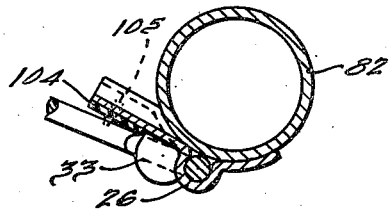
Fig. 16 is an enlarged sectional view of the structure illustrated in Fig. 13, taken on the line 16—16 thereof.
Figure 17:
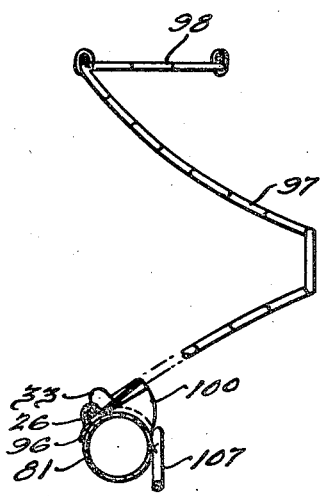
Fig. 17 is an enlarged sectional view of the structure illustrated in Fig. 14, taken on the line 17—17 thereof.
Figure 18:
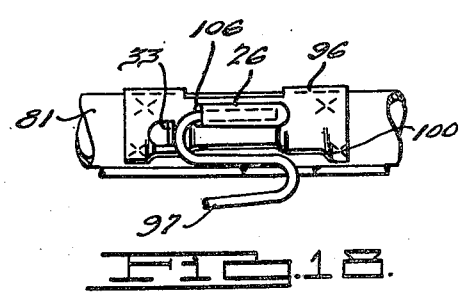
Fig. 18 is a sectional view of the structure illustrated in Fig. 14, taken on the line 18—18 thereof.

It will be noted further from Figs. 14 and 15 that an additional wire 107 is applied to the inner surface of the border frame 81 for the purpose of providing a securing element to which the upholstery material may be hog-ringed or otherwise secured after being applied to the padded spring construction. It is to be understood also that in constructing the spring seat assembly the gauge of the wire may vary depending upon the seat characteristics to be produced and that this may be the same or of different gauges in the main strip 85, the helper strip 93 and in the side supporting spring elements 97. In the construction illustrated, the springs 85 and 97 are made of 9-gauge wire, while the helper spring 93 is made of 11-gauge wire. As pointed out hereinabove, the gauges of the various wires may be changed relative to each other to provide a seat conforming to the automobile body requirements.

When constructing the seat spring assembly, preferably the helper springs 93 are attached to the seating portion 87 of the spring strips 85, after which the ends of the rear end portions are inserted in the tunnels in the strip 82 and rocked downwardly to have the adjacent loop disposed forwardly of the tabs 33, after which the ends at the front of the strips are slid into place over the tabs 33. The border wire 94 having the wires 96 attached to the sides is then applied to the front and sides of the seat area 87, being clipped to the front ends 89 of the springs 85 and and hog-ringed to the loops of the endmost spring strips 99. The listing strip 36 is then hog-ringed to the V portion 88 and to the seating portion 87, as pointed out hereinabove, and the springs 97 are then applied to the side portions of the frame and border wire. The two frames are so constructed that they are either pivoted or rigidly secured together to be in back and seating relation to each other. The units thus formed may have the back and seat portions padded and upholstered before being assembled together, or the upholstery may be applied after the units are assembled in unit relation to each other.

What is claimed is:

1. In a frame construction having longitudinally extending members spaced by side members, one of said longitudinally extending members containing spaced tunnels, each tunnel having one end open and the opposite end closed for receiving the end of a spring strip; and a tab for each tunnel spaced from the open end thereof and out of alignment therewith and positioned for retaining the end of the spring strips within the tunnel.

2. In a frame construction having longitudinally extending spaced members, projecting tunnels extending from at least one of said members, each tunnel having one end open and the opposite end closed, and projecting tabs extending from said member, each spaced from and out of alignment with an open end of a tunnel for retaining the ends of spring strips therein while permitting substantial pivotal movement in the tunnel relative to the strips.

3. In a spring cushion construction, spaced front and rear frame members joined by side members, zigzag spring strips for spanning said frame members; retaining means on the rear frame member for engaging the rear ends of the zigzag spring strips in a manner to permit pivotal movement relative to the frame member, tabs extending outwardly of the frame member, each tab being adjacent to a retaining means for securing the rear end of one of the spring strips therewithin after said one spring strip has been moved a substantial angular distance in one direction, means for limiting the pivotal movement of the rear end of the said one spring strip in said direction, and means for securing the spring strips to the front frame member.

4. In a spring assembly having longitudinally extending frame members spaced by side members, spring securing means on all of said members, sinuously formed wire spring strips secured across said frame to the securing means on the longitudinally extending members to provide a seating area, and side supporting sinuous springs of V-shape, each having one end secured to a spring securing means on a side member and having a substantially horizontally extending portion on the opposite end secured to the seating area substantially in the plane thereof.

5. A spring assembly as recited in claim 4, including a border wire extending across the front and sides of the seating area and secured to the edges thereof.

6. A spring assembly as recited in claim 5 including, a wire secured to each of the side portions of the border wire, each said wire having an offset portion therein extending parallel to the longitudinal members for receiving the end of the endmost springs which are of shorter length than the first said springs.

7. A spring assembly as recited in claim 6, wherein the spring end securing means on the frame at certain corners of the frame members are offset inwardly to support the ends of the shorter endmost strips inwardly from the supported ends of the other spring strips.

8. A frame construction as recited in claim 1 including, an extension on said one longitudinally extending member and formed at an angle to provide strength and a smooth surface over which upholstery material may extend, and spaced tongues struck out from said extension to which said upholstery material may be secured.

9. A frame member having an element for supporting the end of a zigzag wire strip, said element having an arcuate tongue open on one side for receiving the end of the strip, a struck-up tab at each end of the tongue disposed substantially at right angles to the length of the tongue, the end portions projecting from each end of the tongue being confined between the tabs which limit the endwise movement thereof, the end of the strip being disposable within the tongue with the free end portion of the end projecting from either end of the tongue.

10. In a spring assembly, a frame having spaced longitudinally extending portions joined by side portions, one of said longitudinally extending portions and said side portions being joined by arcuate corner portions, a set of zigzag spring strips, each strip having a load supporting portion terminating at one end in a V-shaped portion, means for securing the free ends of the V-shaped portions to said one longitudinally extending portion of the frame in aligned relation therealong, means for securing the other ends of the spring strips to the other longitudinally extending portion of the frame, a similar spring strip at each side of said set having a shorter load supporting portion, and means for supporting the free ends of the V-shaped portions of the shorter spring strips to the frame at the corner portions thereof in offset parallel relation to said free ends of the V-shaped portions of the first said zigzag spring strips.

11. A spring assembly as recited in claim 10 including, a U-shaped border wire disposed along one edge and both sides of the load supporting portion of said set, a filler wire secured to said border wire at each side thereof having an end portion formed to extend parallel to and spaced from the portion of the border wire extending along said one edge, and means securing the end of each load supporting portion of the said shorter spring strips to said parallel end portion of said filler wires.

12. A spring assembly as recited in claim 11 including, a further offset parallel portion in each said filler wire, and additional spring strips, one located at the outer side of each said similar spring strips and having a shorter load supporting portion than the said shorter load supporting portion of said similar spring strips, the free end of each said additional spring strips being secured to a second offset parallel portion in said filler wires.

13. A border wire for the load supporting area of a zigzag spring assembly having one edge and two diverging side portions, a side filler wire secured to each diverging side portion, each wire having two stepped right-angle leg portions, one set of corresponding leg portions of each wire extending parallel to the edge portion of the border wire, the corresponding leg portions of the other set of each wire being disposed in parallel offset relation to each other and secured to the diverging side portions of the border wire.

14. A spring assembly made of a first set of zigzag spring strips each having an arched load resisting portion and two V-shaped portions extending inwardly of the assembly from the opposite ends of the load resisting portion and supporting the same, a second set of zigzag spring strips, each formed to provide an oval having the two terminal ends disposed in adjacent relation, means securing the ends of each oval to a strip of the first set, means secured to the free ends of the V-shaped portions and so formed as to restrain the ends from deflecting when a load is applied to the load resisting portions, and a wire element disposed at right angles to the strips of said sets secured to each oval at a point opposite to the said end securing means of the oval.

15. A spring assembly as recited in claim 14 including, a spring strip disposed parallel to the strips of said sets and secured to said wire element to provide additional support therefor intermediate the ends thereof.

16. In a spring construction having a frame with zigzag spring strips extending thereacross and supported thereon, one end of each strip having a V-shaped portion, one end of which is attached to the frame, pointed tabs projecting from the frame adjacent to the supported ends of the V-shaped portions, a listing strip having a longitudinally extending element supported along one edge, said element and tabs cooperating to secure said listing strip edge to the frame, and hog rings for attaching the opposite edge of the listing strip to certain of said spring strips with the listing strip disposed across the mouths of the V-shaped portions of the spring strips.

17. In a spring cushion assembly, a frame having front, rear and side members, a set of zigzag spring strips spanning the space between the front and rear members of said frame, zigzag spring elements each having a substantially V-shaped portion and an arm extending from one end of the V-shaped portion and lying above such portion, means for securing to each side member of the frame the opposite end of the V-shaped portion of a spring element, a border wire overlying the front and side members of the frame, the portion of the border wire overlying the front of the frame being secured to each of the plurality of spring strips, and means for securing the arms of said V-shaped spring elements to the sides of said set and to the side portions of the border wire.

18. In a spring construction, a zigzag spring strip made of wire bent back and forth to have straight portions joined by oppositely disposed loops, a second zigzag spring strip similar to the first zigzag spring strip except for being originally shorter in length than a corresponding portion of the first said strip by having the straight portions disposed closer together, said second strip being stretched to have a length substantially equal to said corresponding portion of the strip, and means securing the two strips together to have the straight portions thereof disposed in aligned relation to the straight portions of said first spring strip.

19. A spring assembly as recited in claim 18, wherein one of said spring strips is made of wire of larger cross-section than that of said other spring strip.

20. In a spring cushion construction, a pair of spaced frame members, sinuous spring strips made of wire bent back and forth to provide oppositely directed adjacent loops joined by straight portions each formed to have a load resisting portion and attaching end portions, means for securing the attaching end portions to the spaced frame members, additional sinuous spring strips of shorter length than said load resisting portions of the first said sinuous spring strips, and means for securing the second said spring strips to the load supporting portions of the first said spring strips intermediate the ends thereof with the straight portions of the two strips disposed substantially in aligned relation.

21. In a spring cushion construction, spaced front and rear frame members, said rear frame member being elevated to provide a foot access opening to the space beneath the rear portion of the seat, spring strips made of wire bent in sinuous form and arched over and spanning the space between said frame members, means securing the front end of each spring strip to the top portion of the front frame member, the rear end of each spring strip extending from the bottom portion of the rear frame member, and means securing said rear end of the strips to said rear frame member.

22. A spring cushion construction as recited in claim 21 including, means for engaging the spring strips adjacent to the front secured ends thereof for retaining the ends against downward rotation.

23. A spring cushion construction as recited in claim 22, including means for engaging the spring strips adjacent to the rear secured ends for retaining the ends against upward rotation while permitting the ends to pivot downwardly.

24. A spring cushion construction as recited in claim 21 including, means for engaging the spring strips adjacent to the rear secured ends for retaining the ends against upward rotation while permitting the ends to pivot downwardly.

25. In a spring cushion construction, spaced front and rear frame members, a plurality of zigzag spring strips, each having a load supporting portion and a rear portion which is offset from and located below the end of the load supporting portion and extended rearwardly therefrom, and means for attaching said rearwardly extending end of each spring strip to said rear frame member, with the rear end of the load supporting portion disposed forwardly of the frame member in a position to be free to deflect downwardly relative thereto and to the attached end.

26. In a spring cushion construction, spaced front and rear frame members, a plurality of zigzag spring strips, each having a load supporting portion and at the rear end a downwardly offset rearwardly extending attaching portion, means for securing the front end of each spring strip to the front frame member, means for securing the ends of the rearwardly extending attaching portions of the spring strips to the rear frame member, with the rear ends of the load supporting portions being disposed adjacent to the front face of the rear frame member in position to deflect downwardly relative thereto.

27. In a spring cushion construction, spaced front and rear frame members, a plurality of zigzag spring strips, each having a load supporting portion and at the rear end a downwardly offset attaching portion, means for securing the front ends of the spring strips to the front frame member, means for securing the ends of the rear attaching portions of the spring strips relative to the rear frame member in a manner to have the rear ends of the load supporting portions disposed adjacent to the front face of the rear frame member in position to deflect downwardly relative thereto.

28. In a spring cushion construction, spaced front and rear frame members, a plurality of zigzag spring strips, each having load supporting portions with downwardly offset V-shaped attaching ends, means for securing the front attaching end of each spring strip to the front frame member against downward pivotal movement, and means for supporting the rear attaching end of each spring strip to the rear frame member against upward pivotal movement.

29. A spring cushion construction as recited in claim 28, wherein the rear ends of the load supporting portions extend over and beyond the forward portions of the rear offset attaching ends.

30. A spring cushion construction as recited in claim 28, wherein said rear ends of the load supporting portions are so positioned as to be capable of deflection below the top of the rear frame member forwardly thereof.

RICHARD J. WILLIAMS.
GLYNN L. STINE.
FREDERICK C. MATTHAEI, Jr.

REFERENCES CITED

The following references are of record in the file of this patent:

UNITED STATES PATENTS

| Number | Name | Date |
|---|---|---|
| 118,782 | Blackeney | Sept. 12, 1871 |
| 2,185,036 | Menge | Dec. 26, 1939 |
| 2,202,301 | Probst | May 28, 1940 |
| 2,202,630 | Hauber | May 28, 1940 |
| 2,214,136 | Hopkes | Sept. 10, 1940 |
| 2,241,909 | Hoven et al. | May 13, 1941 |
| 2,244,469 | Menge | June 3, 1941 |
| 2,248,093 | Kronheim et al. | July 8, 1941 |
| 2,253,914 | Probst | Aug. 26, 1941 |
| 2,266,896 | Nordmark | Dec. 23, 1941 |
| 2,285,827 | Neely | June 9, 1942 |
| 2,293,566 | Shanahan | Aug. 18, 1942 |
| 2,341,015 | Blumenstaadt et al. | Feb. 8, 1944 |
| 2,341,419 | Bank | Feb. 8, 1944 |
| 2,364,499 | Wolofski | Dec. 5, 1944 |
| 2,375,289 | Deutsch | May 8, 1945 |
| 2,471,158 | Neely | June 21, 1949 |
| 2,480,667 | Neely | Aug. 30, 1949 |

FOREIGN PATENTS

| Number | Country | Date |
|---|---|---|
| 574 | Great Britain | of 1877 |